(12) United States Patent
Johansson et al.

(10) Patent No.: US 9,805,215 B1
(45) Date of Patent: Oct. 31, 2017

(54) MAPPING IDENTIFYING INFORMATION

(71) Applicant: Amazon Technologies, Inc., Seattle, WA (US)

(72) Inventors: Jesper Mikael Johansson, Redmond, WA (US); Dominique Imjya Brezinski, Seattle, WA (US); Darren Ernest Canavor, Redmond, WA (US); Darin Keith McAdams, Seattle, WA (US); Jon Arron McClintock, Seattle, WA (US); Brandon William Porter, Yarrow Point, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/828,276

(22) Filed: Aug. 17, 2015

Related U.S. Application Data

(63) Continuation of application No. 13/887,143, filed on May 3, 2013, now Pat. No. 9,129,118.

(51) Int. Cl.
*G06F 21/62* (2013.01)
*H04L 29/06* (2006.01)

(52) U.S. Cl.
CPC .......... *G06F 21/6245* (2013.01); *H04L 67/42* (2013.01)

(58) Field of Classification Search
CPC ....................................................... G06F 21/62
USPC ............................................................ 726/26
See application file for complete search history.

(56) References Cited

U.S. PATENT DOCUMENTS 7,757,272 B1 * 7/2010 Dean ................. H04L 29/12396
 713/162
7,870,253 B2 * 1/2011 Muilenburg ...... G06F 17/30702
 709/224

* cited by examiner

*Primary Examiner* — Jacob Lipman
(74) *Attorney, Agent, or Firm* — Thorpe North & Western, LLP.

(57) ABSTRACT

A technology is described for making a decision based on identifying without disclosing the identifying information. The method may include receiving a mapping value that represents identifying information that has been converted into a mapping value. A request for data associated with the identifying information may be made by providing the mapping value as a proxy for the identifying information whereby the data associated with the identifying information may be located using the mapping value and returned to a requesting client or service.

10 Claims, 12 Drawing Sheets

98132 <u>505</u>

9813 <u>510</u> ea50 fb37 fdda 7dd9 b3b4 2c6f 4a8b 3d3f <u>515</u>

[Metadata = First Four Digits Hashed] <u>516</u>

518

| Zip Code Hash Value <u>520</u> | Shipper <u>525</u> | Rate <u>530</u> |
|---|---|---|
| ea5 0fb3 7fdd a7dd 9b3b 42c6 f4a8 b3d3f | Shipper X | $$ |
| 0383 314b f626 0523 13b8 2756 38fc ccce | Shipper Y | $ |
| 4a5a 0622 17ab ffbd da8a 5509 68a2 4c7a | Shipper Z | $$$ |
| ecf9 902e 0f61 677c 8de2 5ae6 0b65 4669 | Shipper X | $ |

535

MAPPING IDENTIFYING INFORMATION

RELATED APPLICATIONS

This is a continuation of U.S. application Ser. No. 13/887,143, filed May 3, 2013, which is incorporated by reference in its entirety herein.

BACKGROUND

Third party computer systems may often request information that may be considered sensitive in nature to a first party which has collected the information from an individual user. For instance, information that may be used to identify an individual may be considered sensitive information due to the privacy concerns of individuals and privacy policies adopted by businesses. In order to perform certain functions, some systems may request access to personally identifiable information (PII). For example, a shipping system may provide a shipping price quote based upon a customer's address. A shipper may charge different prices depending upon where an item is to be shipped. Therefore, the shipping system may request the customer's shipping address before the shipping system will provide a shipping price quote. Although the shipping system may request a customer's address, a business may be reluctant to provide the shipping system with the customer's address because the customer's address may be considered personally identifiable information (PII) that a business may prefer not to share with the shipping system.

Although the amount of personally identifiable information (PII) shared with a system may be reduced to a minimal amount, the minimal amount of personally identifiable information shared with the system may be enough information to allow a rogue individual or entity to make a positive identification based on the supplied personal identifiable information. For example, in order to provide a shipping quote, a shipping system may request a customer's zip code. Although the customer's zip code may be minimal personally identifiable information, an interested individual or entity may use the customer's zip code, combined with other information, to determine certain identity information for a person.

DETAILED DESCRIPTION

Figure 1:
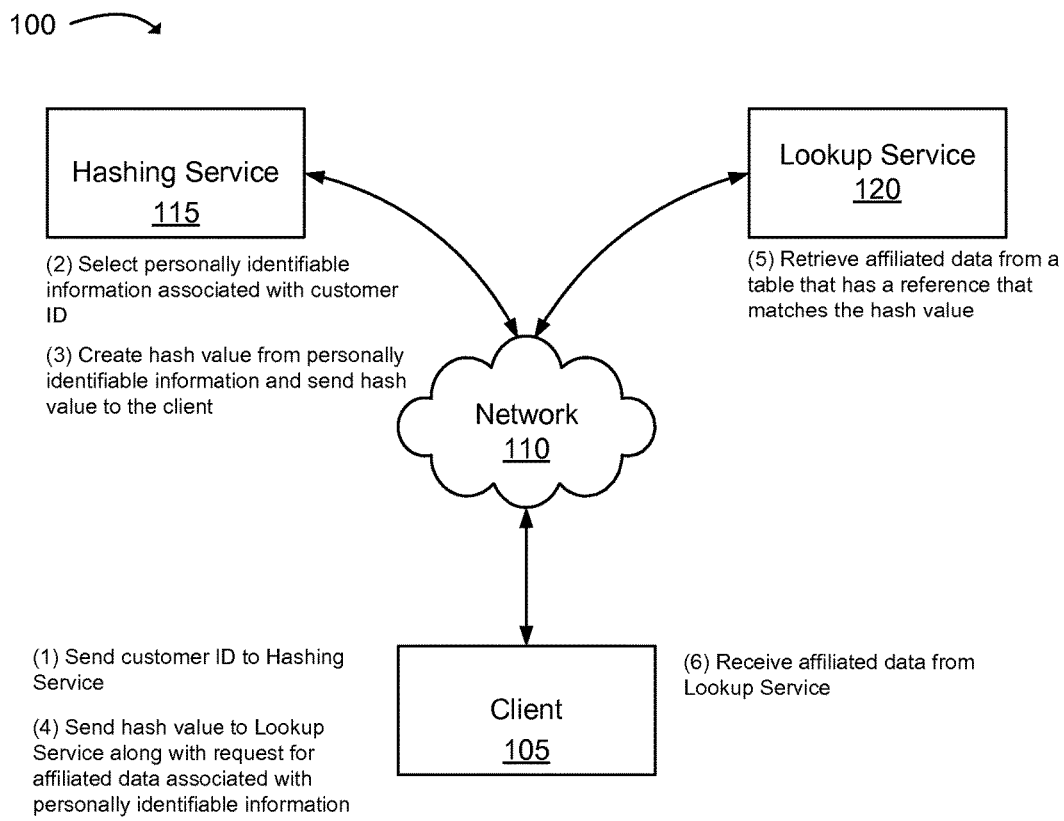
FIG. 1 is a diagram illustrating an example of a system for hiding personally identifiable information.

A technology is provided for making decisions based on identifying information without disclosing the identifying information by using a mapping value as a substitute for the identifying information. A mapping value may be an identifier used to reference affiliated data that may be associated with identifying information. In one example, a mapping value may be derived from identifying information by using a hash function to convert the identifying information into a hash value (i.e., mapping value) that may be stored in a hash value set. The resulting hash value may then be used in place of the identifying information to retrieve data linked to the hash value set. Data associated with the identifying information (affiliated data) may be associated with a hash value set. The affiliated data may be identified by a hash value reference that matches a hash value used to lookup the affiliated data. In another example, a service may arbitrarily assign a mapping value to represent identifying information and affiliated data may then be linked to the mapping value. For purposes of convenience, the example of a mapping value using a hash function to derive a hash value from identifying information is primarily used throughout this specification. Referencing affiliated data using a mapping value rather than the actual identifying information may protect the identifying information from system vulnerabilities. For example, some systems may include client modules that may make requests to other modules (e.g., web services) within the system for information. Sometimes a client module may make a request for information that may be considered sensitive, such as information that may identify a person or an entity. Using the described technology may allow a client to make requests for information related to identifiable information without directly possessing the identifiable information.

One category of information that may be protected within a system may be personally identifiable information. Personally identifiable information may be information that may be used alone or in combination with other information to identify, contact, or locate a person or to determine an identity of a person in context. For example, personally identifiable information may be maintained by a business or a government, and may include information that can be used to distinguish or trace a person's identity, such as a name, home address, social security number, date and place of birth, mother's maiden name, biometric records and any other information that may be linked or may be linkable to a person, including medical records, education, financial information and/or employment information. Of course, many more items may be added to the list of personally identifiable information.

Many countries and local governments have enacted privacy laws and standards that protect personally identifiable information. As a result of the focus on protecting personally identifiable information and the possible consequences associated with failing to protect personally identifiable information, the technology disclosed in this specification may enable businesses, governments and/or individuals to protect personally identifiable information contained in a system by obfuscating or hiding the personally identifiable information. Using one example, the technology may hide the personally identifiable information by employing a method that may use a hash function to generate a hash value for the personally identifiable information or a portion (e.g., a number of characters) of the personally identifiable information. The hash value may then be used in a lookup or search transaction as a proxy for the actual personally identifiable information. A tradeoff in storage space in return for information security may result in using the technology. This may be because of the additional space that may be needed to store a set of hash values. For instance, an actual value for a range may be stored in a single row of a table, whereas a range represented as a set of hash values may be stored in multiple rows of a table to represent the range. Therefore, storing a hash value set to represent a range of values may necessitate additional storage space in a table as compared to storing an actual range value. Hashed set values that represent ranges may also overlap and increase the rows that may be stored due to overlapping sets that may contain duplicate hashed values representing duplicated underlying values.

The present technology may be used to hide any type of sensitive information, whether the information may be personally identifiable information (PII) or some other type of private information. The term personally identifiable information (PII) may be used throughout this discussion with the understanding that the present technology is not limited to information deemed as personally identifiable information (PII).

FIG. 1 illustrates a high level example of a system 100 that may hide or obfuscate personally identifiable information by providing a mapping value for the personally identifiable information to other components and/or modules of the system 100. In this example, a hashing function may be used to derive a mapping value (i.e., hash value) from personally identifiable information. The hash value may be used in place of the actual personally identifiable information. In this example, the system 100 may contain a client 105 that may communicate with other components and/or modules of the system 100 via a network 110. The system 100 may include services that may be available to the client 105, such as a hashing service 115 and a lookup service 120. In one example, the hashing service 115 may have access to a customer's personally identifiable information and may use a hashing function to generate a hash value based upon the customer's personally identifiable information. Using the hash value, the lookup service 120 may provide the client 105 with information that may be related to a customer's personally identifiable information.

For example, a client 105 may be tasked with retrieving information about shipping rates based on a customer's zip code. Because a customer's zip code may be personally identifiable information, the zip code may be shared with as few of the components and services of the system 100 as possible. Therefore, rather than give the client 105 the customer's actual zip code, the client 105 may be provided with a substitute to a customer's zip code that may be used to retrieve information associated with the customer's zip code. One example of a substitute may be a hash value generated by providing a portion of the customer's personally identifiable information to a hash function. The hashing service 115 may be used to provide the hash value to the client 105. For example, a client 105 may be provided with a customer ID that may be sent to the hashing service 115. The hashing service 115 may use the customer ID to select or retrieve personally identifiable information that may be associated with the customer ID. For example, the hashing service 115 may have access to a data store that may contain customer information. Included in the data store may be customer information that may be considered personally identifiable information (e.g., zip code). The hashing service 115 may query the data store for the desired personally identifiable information associated with the customer ID.

Upon receiving a customer's personally identifiable information, the hashing service 115 may, in one example, create a hash value from the personally identifiable information. The resulting hash value may then be used to lookup affiliated data in a data store where a range of affiliated data may be referenced using the hash value. As a specific example, a shipper may set shipping rates according to a range of zip codes where the shipper may deliver. The range of zip codes that the shipper may deliver to may be stored in a data store as a set of hash values, where each hash value represents a single zip code. The hash value created by the hashing service 115 may be used by the lookup service 120 to lookup the shipping rate associated with the hash value set that contains the matching hash value created by the hashing service 115.

In another example, rather than converting an entire field or entire alpha-numeric string of the personally identifiable information into a hash value, a portion of the personally identifiable information may be converted into a hash value. For instance, the first three characters or values of the personally identifiable information may be used to generate a hash value. The hash value may then be used as a substitute for the personally identifiable information and may act as a lookup (e.g., an index) to the affiliated data in the data store associated with the personally identifiable information. As a more specific example, in a case where the personally identifiable information is a zip code, the hashing service 115 may convert the first, two, three, or four digits of the zip code to a hash value. The hash value produced by the hashing service 115 may match hash values in a table or index for information associated with personally identifiable information that may be stored in a data store accessible to the lookup service 120. Instead of containing actual personally identifiable information, the tables contained in the data store may store a hash value or be referenced by a hash value that represents the personally identifiable information. In addition, the data store may contain a set or grouping of hash values representing a range of personally identifiable information. For example, upon ingesting information into a data store, personally identifiable information associated with information contained in the data store may be converted into a hash value and may be used as a lookup for the information.

In one example, the determination of how many characters of the personally identifiable information used to generate a hash value may be based upon how a range of information may be stored and/or referenced in a data store that the lookup service 120 may query. For example, in a case where a data store may store shipping information referenced by a hash value representing a zip code range, the hash value representing the zip code range may be generated using the first four digits of the zip code. For instance, using the five digit zip code 98016, if the first four digits are converted to a hash value, the resulting hash value may represent a zip code range of 98010 to 98019. Depending upon the number of digits that are converted into a hash value, the zip code range may be expanded or reduced.

In another example, the number of characters of personally identifiable information used to generate a hash value may be determined by how a method may use the present technology. For example, the technology may be used for a partial lookup service. The partial lookup service may use a hash value representing a part of some personally identifiable information and then return any information that has a lookup hash value (e.g., an index) matching the hash value. For instance, the first three characters of personally identifiable information may be provided to a client 105 and converted into a hash value by the hashing service 115. The client 105 may then provide the hash value to the lookup service 120, which may then query a data store for information that may be associated with hash value.

Returning to FIG. 1, after generating a hash value, the hashing service 115, may then provide the client 105 with the hash value. The client 105 may then send the hash value to the lookup service 120 as part of a request for information associated with personally identifiable information. For example, the client 105 may request shipping information for a zip code associated with a customer ID. The client may send a hash value to the lookup service 120 representing a range of zip codes along with the size and weight of the item being shipped.

Upon receiving the request from the client 105, the lookup service 120 may then query a data store table that may be referenced by hash values representing personally identifiable information. Upon finding a match for the hash value (e.g. in a table), the data store may return the information that may be associated with the hash value representing the personally identifiable information to the lookup service 120. The lookup service 120 may then provide the client 105 with the information. Continuing the example above where the client 105 requested shipping information for a zip code, the lookup service 120 may query a shipping information data store for shipping information for the zip code range represented by the hash value provided by the client 105. A range of zip codes may be stored in a shipping information data store as a set of hash values representing the range of zip codes. For example, each zip code within the range may be represented by a separate hash value. The shipping rate and carrier associated with the zip code range may be duplicated over the hash value set. The lookup service 120 may query the shipping information data store for a row matching the hash value and may then provide the client 105 with the shipping rate and carrier associated with the zip code returned to the lookup service 120. Alternatively, because a shipper may set shipping rates based upon a range of zip codes (e.g., the same shipping rate applies to the range of zip codes 98010 to 98019), the range may be stored in the shipping information data store in a single row with a hash value as a reference to the row. For example, the value 9801 may be converted to a hash value that represents the zip code range 98010-98019. The query may return to the lookup service 120 the shipping rate and carrier associated with the hash value (e.g., 9801).

Figure 2:
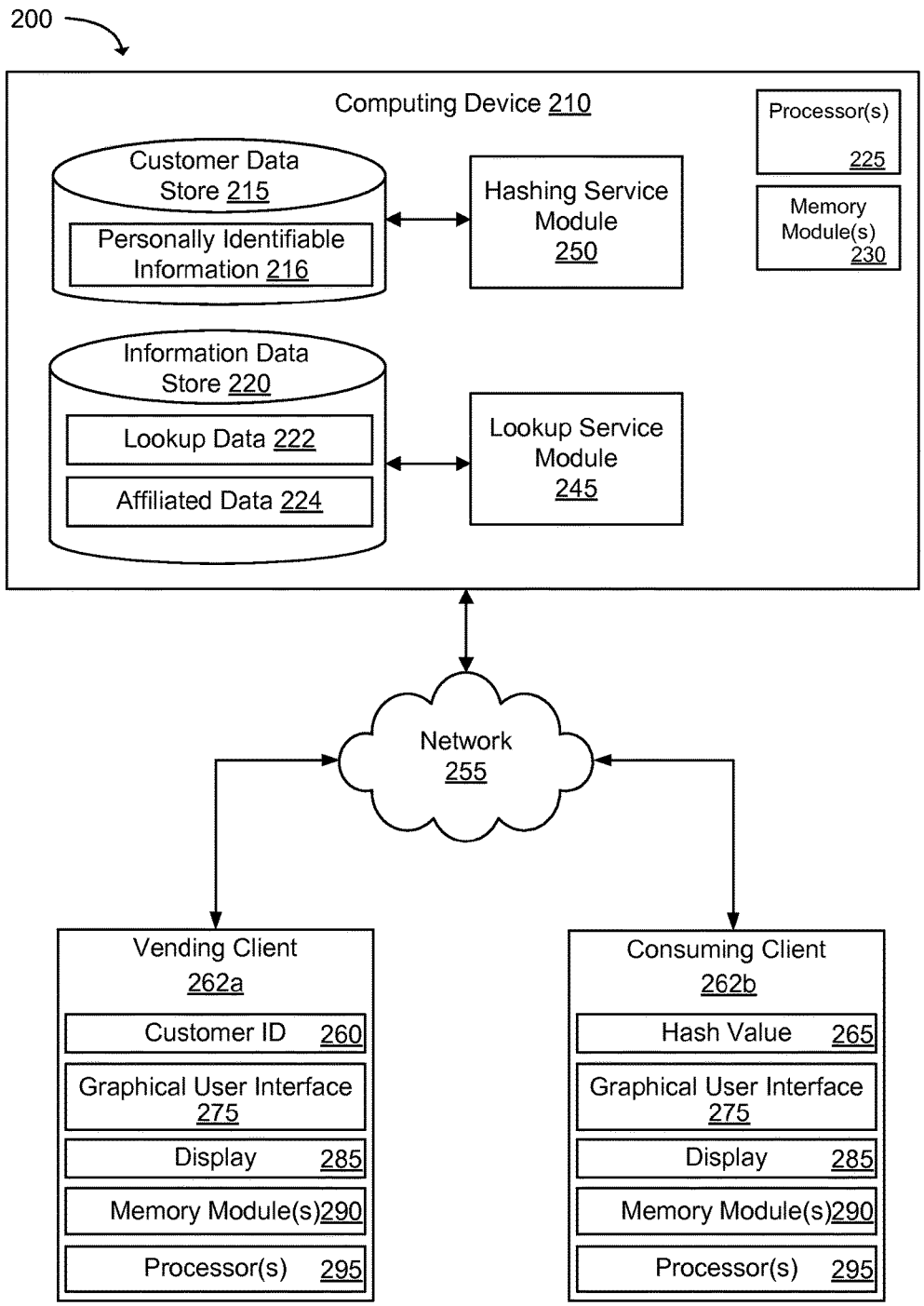
FIG. 2 is a block diagram illustrating an example system to hide personally identifiable information.

FIG. 2 illustrates an example system 200 that may be used to obfuscate personally identifiable information. The system 200 may contain one or more computing devices 210 that may be in data communication with one or more clients 262 by way of a wired or wireless network 255. Various applications and/or other functionality may be executed in the computing device 210 including certain modules to perform desired functions for the technology. For example, the computing device 210 may include a hashing service module 250, a lookup service module 245 and other services, processes, systems, engines, or functionality not discussed in detail herein.

A hashing service module 250 may provide to a client 262 a hash value generated from personally identifiable information and/or by selecting a sub-set of information (e.g., a number of characters) from personally identifiable information. The hashing service module 250 may use any one of a number of hash functions to produce a hash value. Useful hash functions may include, but are not limited to, National Institute of Standards and Technology (NIST) recognized cryptographic hash functions. Among such cryptographic hash functions may be secure hash algorithm 1 (SHA-1), message-digest algorithm 5 (MD5), and/or a hash based message authentication code (HMAC). The hashing service module 250 may receive an identifier from a client 262 and the identifier may be used to identify personally identifiable information. For example, an identifier may be information used to identify an individual. More specifically, an identifier may include a customer ID that may be a randomly generated number or an alpha numeric string that may be uniquely associated with a customer. In another example, an identifier may be a name, a phone number, email address, customer number, employer ID, etc. The hashing service module 250 may use the identifier to retrieve personally identifiable information that may be associated with the identifier. For example, in a case where the identifier may be a customer ID, the hashing service module 250 may query a customer data store 215 for a customer's personally identifiable information 216 associated with the customer ID.

Personally identifiable information 216 may be any type of information that may be used to ascertain a customer. For example, personally identifiable information 216 may include a customer's given name, middle name, surname, maiden name, home address, shipping address, billing address, home phone number, cell phone number, birth date, age, social security number, driver license number, employer, marital status, medical health status, etc. Because of the sensitivity of a customer's personally identifiable information 216, in some examples, personally identifiable information 216 may be constrained to one place within the system 200. Therefore, any service that may have rights to use personally identifiable information 216 may make a request to the customer data store 215 for personally identifiable information 216. Some system service modules may be granted access to personally identifiable information 216 while other service modules may not be granted direct access to personally identifiable information 216, and therefore, may make a request for personally identifiable information 216 via the hashing service module 250. For example, a client 262 may not have permission to access personally identifiable information 216 and so must request a hash value from the hashing service module 250 to use as a substitute for the actual personally identifiable information 216.

A client 262 (or any other service module) that may send a request to the hashing service module 250 may include the personally identifiable information 216 that may be wanted in a request. As an illustration, in order to lookup telephone service provider rates for a customer's area code and prefix, a client 262 may request from the hashing service module 250 the customer's phone number. Because the client 262 may be requesting the customer's phone number to obtain information related to the customer's area code and prefix, the client 262 may include a parameter in the request that may specify a number of characters from the customer's phone number to convert into a hash value. For example, the client's request may look like the following application programming interface (API) call requestHashValue(customerID, phoneNumber, numOfChar), where numOfChar may be equal to a range of characters from 0 to 5. Upon receiving the request, the hashing service module 250 may then query the customer data store 215 for a phone number that may be associated with the customer ID. The hashing service module 250 may then create a hash value from the first six digits of the phone number (i.e., the area code and prefix) and return the hash value to the client 262. By providing the client 262 with a hash value that represents the customer's area code and prefix rather than giving the client the actual phone number, the customer's personally identifiable information may be hidden from the client 262.

As an added measure to protect a hash value representing personally identifiable information from attempted exploits, the hash value may be encrypted by the client 262 or the originating hashing service module 250 and decrypted by a module receiving the encrypted hash value. As an example, a keyed-hash message authentication code (HMAC) may be used to generate a hash value using personally identifiable information. As an example of a HMAC, the client may provide a secret key and use a hash function such as SHA-1 or MD5 to generate a HMAC hash value. Also, other encryption techniques such as RSA encryption may be used by first creating a hash value from personally identifiable information and then encrypting the resulting hash value.

Included in the computing device 210 may be a lookup service module 245. The lookup service module 245 may be configured to retrieve affiliated data 224 associated with personal identifying information 216 from an information data store 220. In one example, the affiliated data 224 may be identified by a hash value contained in a lookup data store 222 that matches the hash value provided by the hashing service module 250. Upon identifying the affiliated data 224 associated with the matching hash values, the affiliated data 224 may be returned to the service module that requested the affiliated data 224. For example, a client 262 that may have received a hash value from the hashing service module 250 may use the hash value as a substitute for a customer's personally identifiable information 216. The client 262 may now request affiliated data 224 that may be associated with the customer's personally identifiable information 216 by providing the lookup service module 245 with the hash value along with a request for the affiliated data 224.

In one example, the lookup service module 245 may query a lookup data store 222 that may contain hash values and a reference to affiliated data 224 that may be associated with the hash values. For example, the lookup data store 222 may contain a table with a first column that contains a number of hash values and a second column that contains a reference to the affiliated data 224 associated with the hash value in the first column. The hash value contained in the first column of the table in the lookup data store 222 may represent a range of personally identifiable information values. As an illustration, in a case where the hash value in the lookup table may represent phone numbers, the hash value may represent a range of phone numbers. For instance, if the hash value represents the phone number 867-5309 and the first six digits of the phone number are converted to a hash value, then the resulting hash value may represent the range of phone numbers 867-5300 to 867-5399. The affiliated data 224 referenced by the second column of the lookup data store 222 would be affiliated data 224 associated with the phone number range 867-5300 to 867-5399. For example, the affiliated data 224 may be a phone service provider that provides the least expensive phone service for the range of phone numbers.

In another example, the lookup data store 222 may contain hash values that may be used to perform a partial lookup. For example, the first column of the lookup data store 222 may contain a number of hash values representing a part of the personal identifiable information and the second column of the lookup data store 222 may contain a number of references to affiliated data 224 that may be associated with the hash value. As an illustration, the hash value may have been created using the first three digits of a phone number (i.e., the area code) and the references associated with the hash value may be to customer complaints received from the area code.

And in a further example, affiliated data 224 may be directly referenced by a set of hash value references that may provide a one to one match for a hash value representing personally identifiable information 216. For example, upon ingesting a range of phone numbers into the information data store 220, the range of phone numbers may be converted into a set of hash values. As an example, the phone number range 867-5300 to 867-5309 may result in a set often affiliated data 224 rows where each row may be referenced by a hash value representing a phone number in the phone number range.

In order to hide personally identifiable information from as many components of the system 200 as possible, personally identifiable information ingested into the information data store 220 may be used to create a hash value lookup (e.g. index) for the personally identifiable information. The hash value lookup may then be associated with the affiliated data 224 that relates to the personally identifiable information used to create the hash value lookup and then the personally identifiable information may be deleted from the information data store 220. Thereafter, the affiliated data 224 may be identified by the associated hash value lookup. For example, in the case where the phone number 867-5309 may be ingested into the information data store 220, the phone number may be associated with a specific phone service provider. Upon ingesting the data, the phone number may be used to generate a hash value lookup. The hash value lookup may be associated with the specific phone service provider and then the phone number 867-5309 may be deleted from the information data store 220.

Upon identifying the affiliated data 224 associated with the hash value, the lookup service module 245 may return to the client 262 the requested affiliated data 224. As a result of the system 200 configuration, personally identifiable information may be constrained to a single source, such as the customer data store 215, and other service modules, clients and data stores within the system 200 may be provided with a hash value substitute for the personally identifiable information rather than the actual personally identifiable information.

A client 262 included in the system 200 may be a device that sends and receives data over a network 255 or may be a service module that executes on a computing device. In one example, a client 262 may comprise, for example a processor-based system such as a computing device. Such a computing device may contain one or more processors 295, one or more memory modules 290 and a graphical user interface 275. A client 262 may be a device such as, but not limited to, a server, desktop computer, laptop or notebook computer, tablet computer or other devices with client capability. The client 262 may include a display 285, such as a liquid crystal display (LCD) screen, gas plasma-based flat panel display, LCD projector, cathode ray tube (CRT), or other types of display devices, etc.

The computing device 210 may comprise, for example, a server or any other system providing computing capability. Alternatively, a number of computing devices 210 may be employed that are arranged, for example, in one or more server banks or computer banks or other arrangements. For purposes of convenience, the computing device 210 is referred to in the singular, it is understood that a plurality of computing devices 210 may be employed in the various arrangements as described above. The computing device 210 may contain various processes and/or other functionality that may be executed on one or more processors 225 that are in communication with one or more memory modules 230 according to various examples. Various data may be stored in one or more data stores that are accessible to the computing device 210. For example, the computing device may contain a customer data store 215 and an information data store 220. The term "data store" may refer to any device or combination of devices capable of storing, accessing, organizing and/or retrieving data, which may include any combination and number of data servers, relational databases, object oriented databases, cloud storage systems, data storage devices, data warehouses, flat files and data storage configuration in any centralized, distributed, or clustered environment. The storage system components of the one or more data stores may include storage systems such as a SAN (Storage Area Network), cloud storage network, volatile or non-volatile RAM, optical media, or hard-drive type media.

The network 255 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof. In addition various service modules and clients may communicate using a local communication interface such as a local data bus and/or any related address or control busses.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, cloud, grid or cluster computing system. An application program interface (API) may be provided for each module to enable a second module to send requests to and receive output from the first module. Such APIs may also allow third parties to interface with the module and make requests and receive output from the modules. While FIG. 2 illustrates an example of a system 200 that may implement the techniques above, many other similar or different environments are possible. The example environment discussed and illustrated above are merely representative and not limiting.

Figure 3:
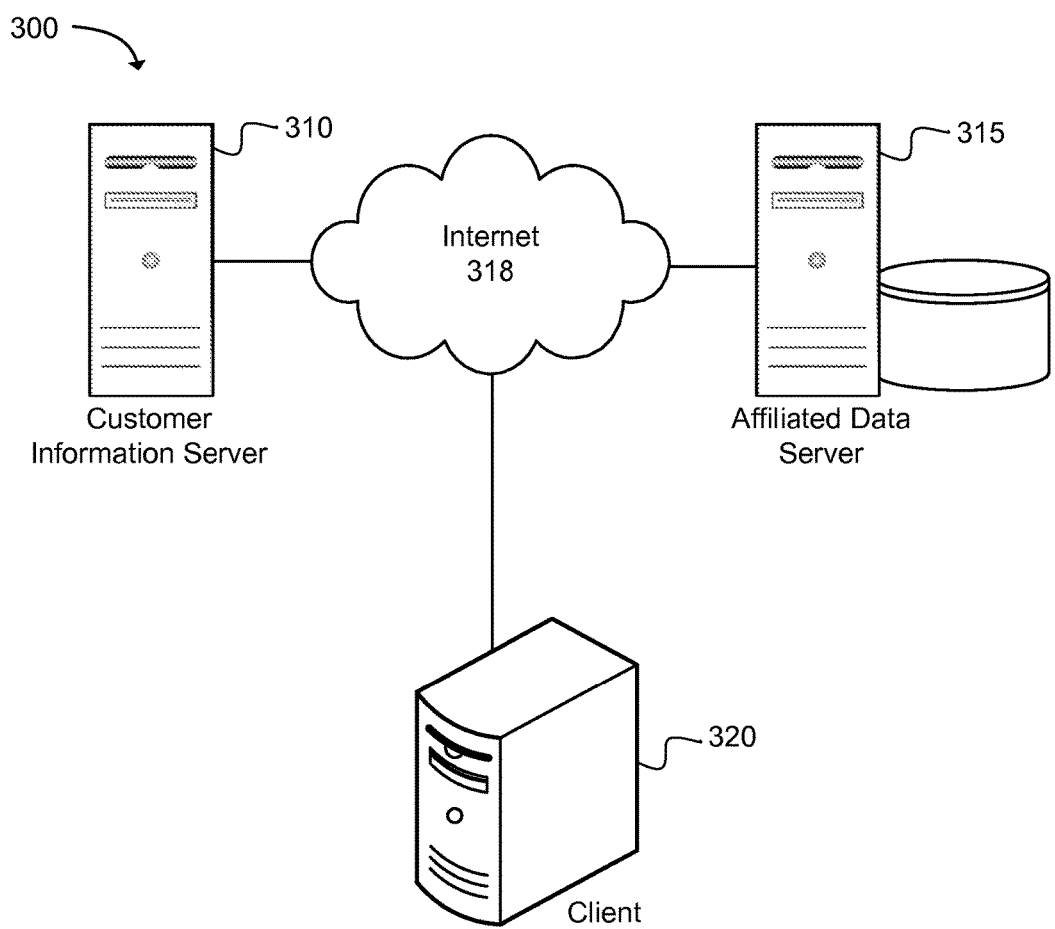
FIG. 3 is a diagram illustrating an example environment used to execute a method to hide personally identifiable information.

FIG. 3 is a system diagram illustrating a high level example of a system 300 that hides personally identifiable information. The system 300 may include a client 320 that may communicate with other components of the system over the Internet 318. The client 320 may be a computing device, such as a server that receives and acts upon requests that may be received from various sources. For example, the client 320 may form part of a web services infrastructure that provides services to other components of the infrastructure. The client 320 may receive requests that may relate to a customer's personally identifiable information. In order to protect personally identifiable information, the system 300 may isolate the personally identifiable information to a limited number of sources within the system 300. Components of the system 300 requesting personally identifiable information may be provided with proxy information for the requested personally identifiable information.

In one example, personally identifiable information may be obfuscated by a hashing service that may execute on a customer information server 310 that may be accessible as a web service over the Internet 318. Also located on the customer information server 310 may be a data store containing personally identifiable information for a number of customers. The client 320 may make a request to an affiliated data server 315 for data relating to a customer's personally identifiable information. In one example, the request may include a customer identifier and the data wanted. Because the affiliated data server 315 may not have access to a customer's personally identifiable information, the affiliated data server 315 may obtain proxy information (e.g., a hash code) from the customer information server 310 for the customer's personally identifiable information. So, the affiliated data server 315 may send to the customer information server 310 a request for a hash value by providing the customer identifier received from the client 320, the type of personally identifiable information (e.g., zip code, email address, etc.) that is to be converted to a hash value and, in some cases, a range that specifies a number of characters of the personally identifiable information to convert to a hash value. The customer identifier may be used to lookup the associated customer's personally identifiable information on the customer information server 310 and then the type of personally identifiable information requested may be retrieved. A hashing service executing on the customer information server 310 may employ a hashing function to create a hash value for the personally identifiable information requested by the client 320 and the resulting hash value may then be returned to the affiliated data server 315.

The affiliated data server 315 may include a data store containing data that may be associated with a number of customer's personally identifiable information. As mentioned earlier, in order to limit the number of components within the system 300 that have direct access to the personally identifiable information, the data contained in the data store may be referenced using a hash value rather than by the personally identifiable information. As an example, data that may be associated with a range of social security numbers may be stored in a data store as a set of hash values referencing the data. A social security number may be converted into a hash value and used to lookup the associated data in the hash set. In another example where a hash value may represent a range of social security numbers, the data associated with the range of social security numbers may be stored in a table in the data store. The rows of the table may be referenced by hash values, one of which may correspond with the hash value provided by the customer information server 310. The affiliated data server 315 may retrieve the data requested by the client 320 from a table with row that has a reference corresponding with the hash value provided by the customer information server 310. The data may then be provided to the client 320 by the affiliated data server 315, thereby limiting the personally identifiable information to a single component of the system 300 (i.e., the customer information server 310) and providing other components of the system 300 with a hash value rather than the customer's personally identifiable information.

Figure 4A:
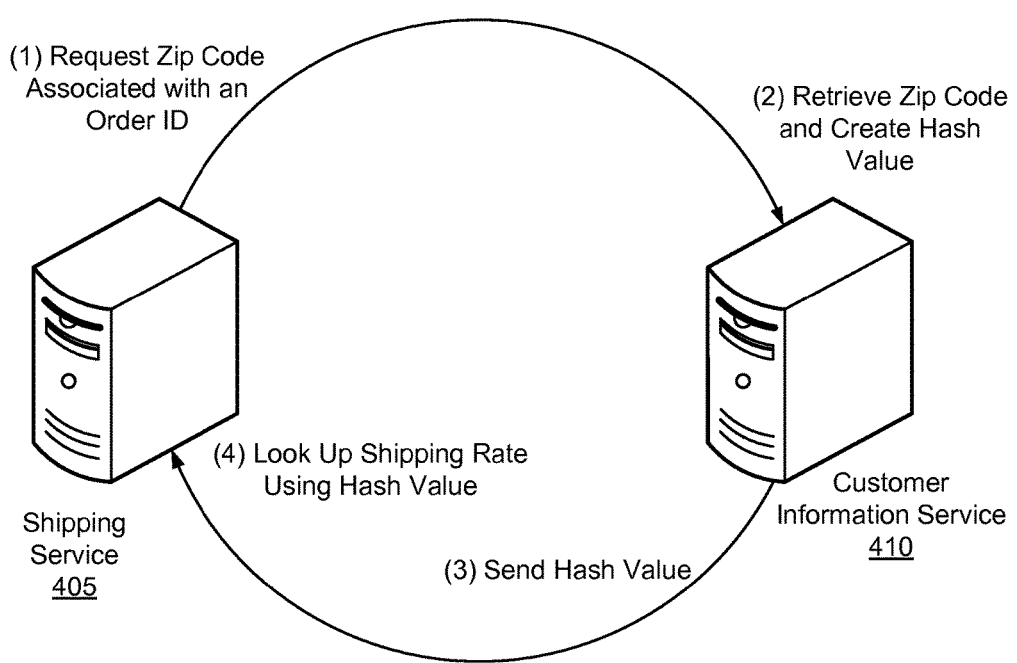
FIG. 4a is a diagram illustrating an example method to hide personally identifiable information.

Moving now to FIG. 4*a*, an example of a method to obfuscate a customer's personal identifiable information when looking up shipping rates is illustrated. A shipping schedule service 405 may provide shipping information, such as shippers, rates, routes, pickups, destinations, etc. to other services and/or modules that may request such information. A shipping schedule service 405 may maintain a table of shippers that provides information for shippers that ship items to particular zip codes and an associated rate or cost. Rather than store zip codes in the table of shippers, which may be considered personally identifiable information, hash values representing a range of zip codes may be stored as substitutes for the actual zip code. Because a shipping table containing an actual zip code may be referenced based upon a zip code range (e.g., 98100-98109), a range may be stored in a single row of the table (e.g., 9810 representing zip codes 98100 to 98109) followed by another row containing the next contiguous range (e.g., 9811 representing zip codes 98110 to 98119). Alternatively, a zip code range may be stored as a set in a shipping table (e.g., row 1=98100, row 2=98101, row 3=98102, etc.) and a zip code range may be selected from the shipping table by selecting a row from the set. The same may not be true for hash values representing a range of zip codes. As an illustration, for the range of zip codes 98100 to 98102, the hash value for the following range of zip codes may be:

98100=21206D8BFB8DB9B567EAA056EA21FCA42-A3DDD03

98101=A5D49252821E2321AEE24DB14E2650FA773-8AC46

98102=042EE5085C78E255A35D45E729C18DA737F-EC47A

Based upon an alphanumeric sort, the hash values above may not be stored contiguously but may be identifiable as part of the set. As a result, hash values may be created that represent a range of zip codes. For instance, a partial zip code may be used to generate a hash value representing a zip code range. For example, the zip code range 98100 to 98109 may be represented by converting the first four digits of the zip code 98100 to a hash value. Thus, 9810 may produce the hash value A27D2E0AAED33F954932F3953AF74A99C-15A023E that may then be stored in a row of the shipping table. The hash value may then be associated with shippers that ship items to zip codes included in the zip code range. In order to expand or reduce the number of zip codes included in a hash value representing a zip code range, the number of digits used to generate the hash value may be increased or decreased respectively. For example, the first digit of the zip code 98109 converted to a hash value may represent a zip code range of 90000 to 99999, the first two digits of the zip code 98109 converted to a hash value may represent a zip code range of 98000 to 98999, and so on.

Because the shipping table accessed by the shipping schedule service 405 may not contain actual zip codes, the shipping schedule service 405 may obtain a hash value substitute for the actual zip code from a customer information service 410. The shipping schedule service 405 may provide to the customer information service 410 an order ID that may be used by the customer information service 410 to lookup a zip code that may be associated with the order ID. The customer information service 410 may then use a part of the zip code or the entire zip code associated with the order ID to create a hash value. In one example, the number of zip code digits used to create a hash value may be determined by the shipping schedule service 405 that requests the hash value. In another example, the number of zip code digits used to create a hash value may be based upon pre-established rules shared between the different services. In either case, a hash value may be created using a number of digits from the zip code associated with the order ID.

The hash value may then be sent to the shipping schedule service 405 requesting the hash value and upon receiving the hash value, the shipping schedule service 405 may look up shipping information in a shipping table. As explained above, a shipping table may be referenced by a hash value representing a range of zip codes as opposed to an actual zip code or zip code range. Upon locating a row within the shipping table that contains a reference matching the hash value provided by the customer information service 410, the desired shipping information may be retrieved from the shipping table and returned to the service or module that requested the shipping information.

Figure 4B:
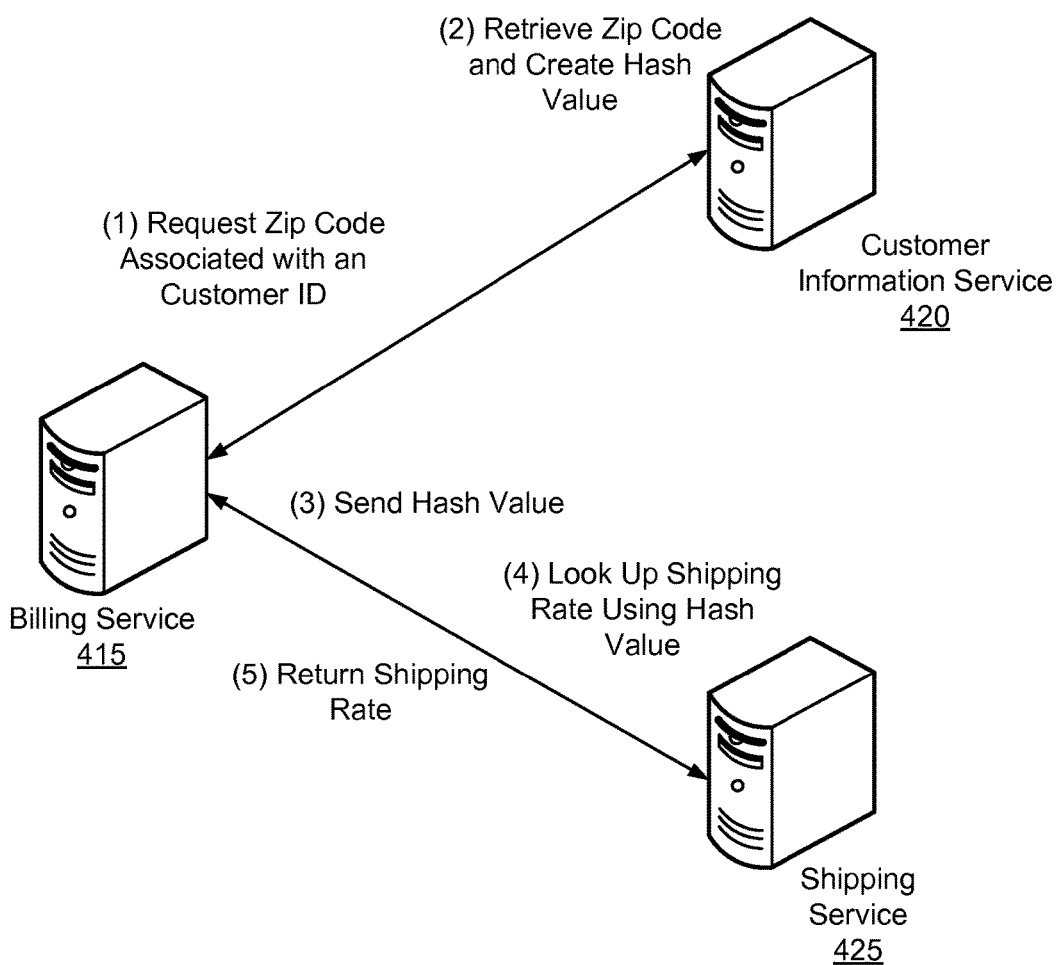
FIG. 4b is a diagram illustrating an example of a system and related method to make a decision based on identifying information without disclosing the identifying information.

FIG. 4*b* illustrates an example of a system and related method to make a decision based on identifying information without disclosing the identifying information. In this example, a billing service 415 may obtain a shipping rate for a customer order by first requesting a zip code from a customer information service 420. The billing service 415 may send to the customer information service 420 a customer ID that may be used by the customer information service 420 to identify a zip code associated with the customer ID. The customer information service 420 may then create a mapping value (e.g., hash value) using the zip code.

In one example, the granularity of a hash value may be based upon an authorization level of a client (e.g., billing service 415). The granularity of a hash value may refer to the number of characters of identifying information used to generate a hash value. Based on a client's authorization level, a subset of characters of the identifying information may be determined. As an example, trusted clients may be provided with a fine granular hash value (i.e., every character of identifying information used to create the hash value) and untrusted clients may receive a course granular hash value (i.e., a small subset of identifying information characters used to create the hash value).

Returning to FIG. 4*b*, after receiving a hash value from the customer information service 420, the billing service 415 may send the hash value to a shipping service 425. The shipping service 425 may then use the hash value to look up a shipping rate that may be affiliated with the hash value. The shipping service 425 may then return the shipping rate to the billing service 415.

Figure 5:
FIG. 5 is a diagram illustrating an example of a method to obfuscate a zip code.
Figure 5:
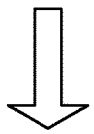
Figure 5:
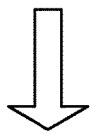

FIG. 5 illustrates an example of a method that obscures a zip code range by converting a portion of the zip code into a hash value. The hash value may then be used to perform a lookup in a shipping table. Because a zip code may be considered personally identifiable information, organizations may wish to hide a zip code associated with an individual from other services and/or components of a system. In this example, a shipping table 518 may contain a shipper 525 and a rate 530 that may be associated with a zip code range hash value 520.

Because there may be no need for the zip code to be stored in the shipping table 518 other than to associate shippers 525 and rates 530 to a specific zip code range, the zip code range in the shipping table 518 may be substituted with a hash value. When a service makes a request for shipping information, the service may be provide with a hash value that may be used to look up shipping information from the shipping table 518. For example, in a case where a service may request a shipper 525 and a shipping rate 530 for a zip code 505, the shipping information associated with the zip code 505 may cover a range of zip codes and as a result, the shipping information may be stored in one row within the shipping table 518 that covers a range of zip codes. Therefore, the service requesting the shipping information may obtain a hash value that represents a range of zip codes and metadata that may indicate the number of digits used to generate the hash value.

In one example, a zip code 505 may be retrieved by a service that has permission to access personally identifiable information. The service may then use a hashing function to generate a hash value for N number of digits of the zip code 505. For example, the service may select the first four digits 510 of the zip code 505 and generate a hash value 515 from the first four digits of the zip code 505. The resulting hash value 515 and metadata 516 indicating that the first four digits were used to generate the hash value 515 may then be used to identify shipping information in the shipping table 518 by locating a zip code hash value 520 that matches the hash value 515.

Upon identifying a row 535 that contains a zip code hash value 520 that matches the hash value 515, shipping information contained within the row 535, such as the shipper 525 and the rate 530 for example, may be retrieved from the row 535 and provided to the service requesting the shipping information. The personally identifiable information (i.e., the zip code) may therefore be hidden in the shipping table 518 and yet, the shipping table 518 may provide shipping information associated with the personally identifiable information by way of a hash value. As will be appreciated, the zip code examples in FIG. 4 and FIG. 5 are merely one example of personally identifiable information that may benefit from the technology. Naturally, any category of sensitive information may be obscured using the methods described in this specification.

Figure 6:
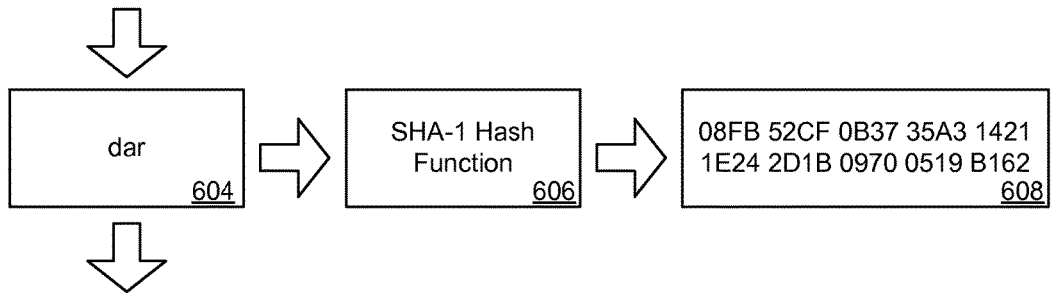
FIG. 6 is a diagram illustrating an example of a method to obfuscate an email address.
Figure 6:
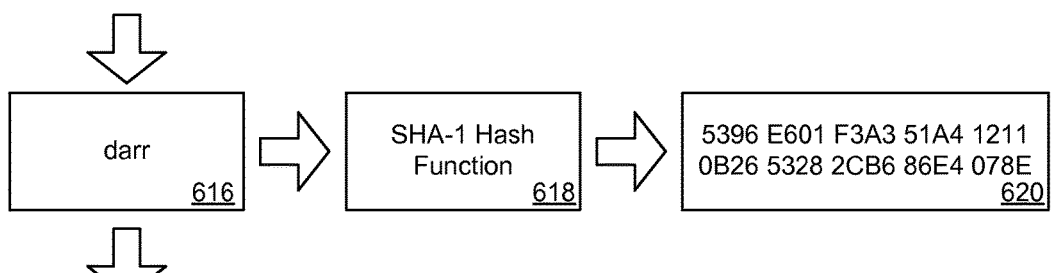

FIG. 6 is an illustration of an example of a method for hiding personally identifiable information, such as an email address, and looking up information associated with the email address based upon a partial lookup. In a case where a client may possess personally identifiable information, but the client may not want to share the personally identifiable information with other services in a system, the client may provide part of the personally identifiable information in the form of a mapping value to another service in the system. The other service in the system may attempt to locate information associated with the personally identifiable information using the mapping value.

As an illustration, a client may know an email address and may make a request to an order management system for orders associated with the email address. The order management system may not know the email address. Rather, the order management system may maintain a customer orders table that contains a set of mapping values, such as hash values representing the email address. The set of hash values may be associated with customer orders. In order to provide a partial lookup, the set of hash values may be stored in the customer orders table in multiple rows with hashes that represent partial email addresses. For example, in a case where order information associated with an email address (e.g., darren@example.com) may be stored in a customer orders table, the order information may be associated with multiple rows of hash values that represent a hashed part of the email address. Because a set of rows may be used, the order information may be duplicated over the set of rows. For instance, the customer orders table may contain four rows with a column containing a hash value reference representing part of the email address and a column containing the order ID, such as the following:

| Email Address | Order ID |
| --- | --- |
| Hash Value (dar) | 08RST |
| Hash Value (darr) | 08RST |
| Hash Value (darre) | 08RST |
| Hash Value (darren) | 08RST |

Of course the part of the email address (i.e., dar, darr, darre and darren) above would be an actual corresponding hash value.

A client may make an initial request for order information associated with the email address 602 by providing a hash value for a number of characters of the email address 602. For example, the first three characters 604 (e.g., dar) of the email address 602 (e.g., darren@example.com) may be selected. Using a hash function, such as a SHA-1 hash function 606, a first hash value 608 may be generated. The first hash value 608 may be sent to an order management system that may return any records that may have a hash value reference 610 matching the first hash value 608. Because many email addresses may begin with the first three characters 604 selected, the order management system may contain multiple records with the same hash value reference 622 and therefore may return more than one record. For example, if the first three characters 604 selected are "dar", then the order management system may return four records with the same hash value reference 610 where the first record may be associated with a "darin", the second record may be associated with a "dara", the third associated with a "darren" and the fourth associated with a "darby".

Because the first search returned multiple records, a second search may be performed by selecting additional characters from the email address 602. In one example, a fourth character may be selected 616 and again using a SHA-1 hash function 618 a second hash value 620 may be created. The second hash value 620 may then be sent to the order management system. The order management system may search for one or more records having a hash value that matches the second hash value 620 and return the one or more records to the client. For example, the order management system may locate one record having a hash value 610 that matches the second hash value 620 and return the record to the client. Having received one record that matches the second hash value 620 and the record contains the order information requested, the client may terminate the search. In a case where the client may have received more than one record, the client may continue to perform an iterative search by selecting additional characters of the email address 602 to convert into a hash value until a single record may be returned. As will be appreciated, any number of characters may be selected in any order to produce a partial lookup using a hash value. For instance, sequences of characters may be chosen, based upon a sequential (e.g., the first five characters in sequential order), non-sequential (e.g., the last ten characters in reverse order), partial (e.g., every other character) or some other method of selection.

Another example of a partial lookup using a hash value may include a service that checks a customer's credit card award points using a hash value as opposed to the actual credit card number. As described in the previous example, a service may select a number of characters of a customer's credit card number and convert the selected numbers to a hash value. The hash value may then be sent to a third party service that may query a credit card award table for award points that may be associated with the hash value.

Figure 7:
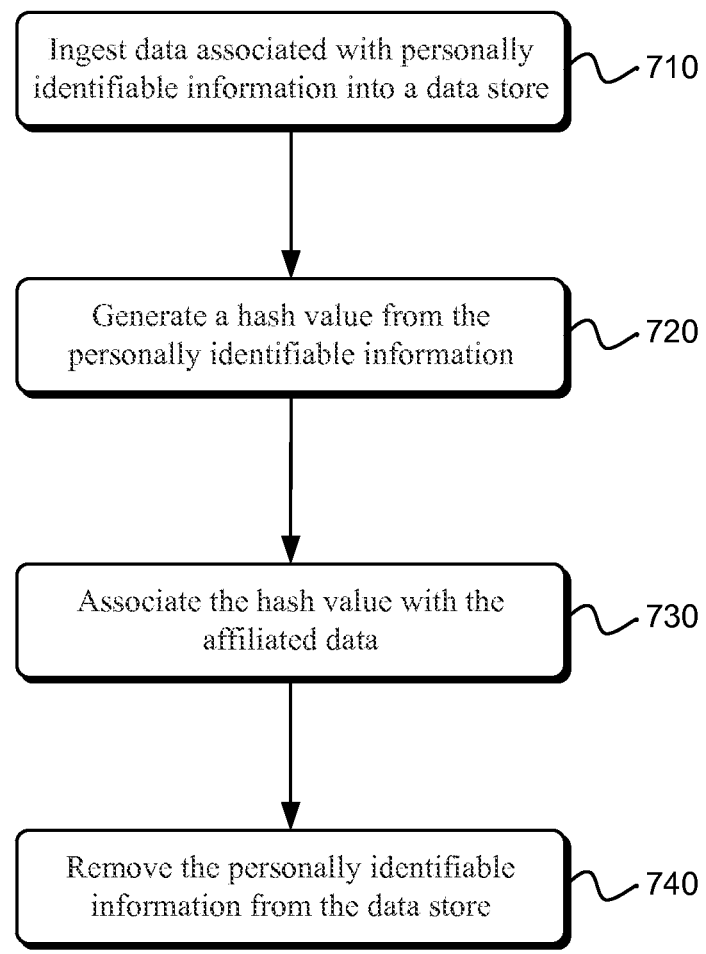
FIG. 7 is a flowchart illustrating an example of a method to ingest affiliated data into a data store.

FIG. 7 is a flowchart illustrating an example method for ingesting affiliated data into a data store. As in block 710, affiliated data associated with personally identifiable information may be ingested (i.e., imported) into a data store. The affiliated data along with the associated personally identifiable information may be, in one example, stored in multiple columns and rows within a table of the data store. In another example, the affiliated data and the personally identifiable information may be stored in separate tables that may be referenced by a key or an index.

As in block 720, a hash value (i.e., mapping value) may be generated from the personally identifiable information or may be arbitrarily assigned. As in block 730, the hash value may be associated to the affiliated data, or in other words, the hash value may be linked to the affiliated data so that the hash value references the affiliated data. After associating the hash value with the affiliated data, as in block 740, the personally identifiable information may be removed (i.e., deleted) from the data store. By removing the personally identifiable information from the data store and replacing the personally identifiable information with a hash value, the personally identifiable information may be hidden from services that may access the data store.

Figure 8:
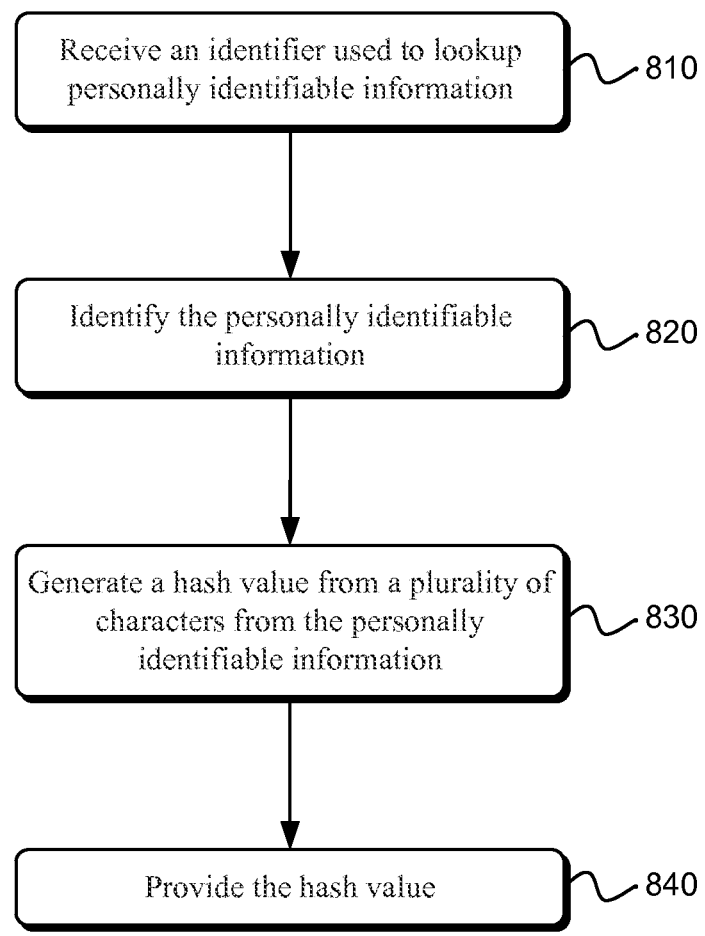
FIG. 8 is a flowchart illustrating a method to obfuscate personally identifiable information by generating a hash value using the personally identifiable information.

FIG. 8 is a flowchart illustrating an example of a method that may be used by a hashing service for obfuscating personally identifiable information. Starting in block 810, a hashing service may receive an identifier used to lookup personally identifiable information. The identifier may be, for example, any word, number, letter, symbol or any combination thereof that may be associated with personally identifiable information. In one example, a parameter may be included with the identifier. The parameter may determine a number of characters of the personally identifiable information to convert to a hash value. For example, the parameter may instruct the hashing service to use N number of characters from the personally identifiable information and may provide a range (e.g., 1 to 10), a pattern (e.g., every other character), a rearrangement (e.g., character 5, character 1, character 3) or may instruct the hashing service to convert every character of the personally identifiable information into a hash value. Also included with the identifier may be a request for specific personally identifiable information, such as a zip code, phone number, social security number, etc.

As in block 820, using the identifier, the hashing service may identify the personally identifiable information. For example, the hashing service may be granted access to a data store that may house personally identifiable information. The hashing service may query the data store by selecting personally identifiable information that may be associated with the identifier. For instance, the hashing service may select a zip code from the data store where the zip code may be associated with a customer ID. The data store may then return the personally identifiable information queried to the hashing service.

As in block 830, the hashing service may generate a hash value from the personally identifiable information. In one example, a hash value may be generated using N number of characters from the personally identifiable information as determined by the parameter described above. In another example, the number of characters of the personally identifiable information used to generate a hash value may be determined by an established rule used by a system that includes the hashing service. And in another example, by default, every character of the personally identifiable information may be used to generate a hash value. Once a hash value may have been generated for personally identifiable information, as in block 840, the hashing service may provide the hash value to the service or module that requested the personally identifiable information.

Figure 9:
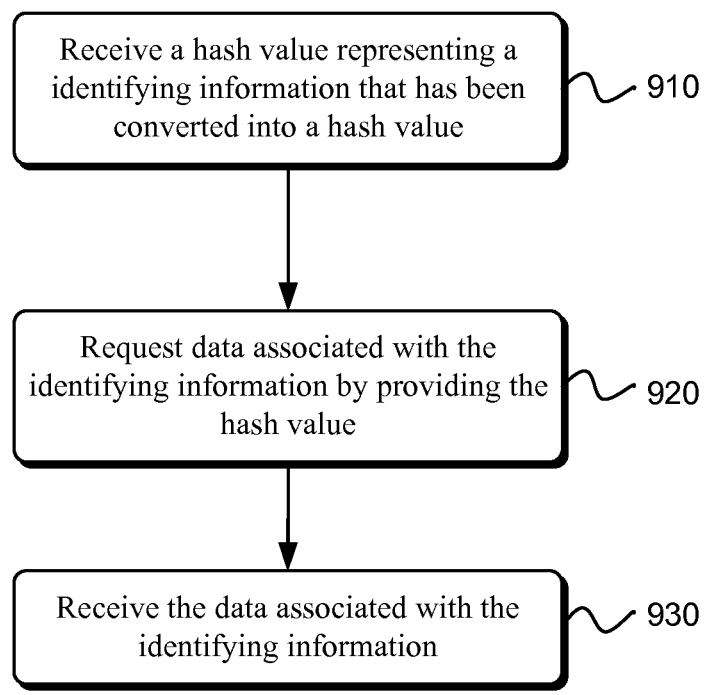
FIG. 9 is a flowchart illustrating a method to make a decision based on identifying information without disclosing the identifying information.

FIG. 9 is a flowchart illustrating an example of a method for obfuscating identifying information for a client that may request affiliated data associated with the identifying information. As in block 910, a client may receive a mapping value, such as a hash value from a service that may have access to identifying information and the hash value may represent identifying information that has been converted into a hash value. The client, in one example may have provided the service with an identifier that may be associated with the identifying information. For example, an identifier may be information provided by the client that may enable the service to locate identifying information associated with the identifier. An identifier may be information such as a customer ID, order ID, patient ID, employer ID or some other type of ID that may be used to locate associated identifying information. Once the service has located the identifying information and created a hash value based on the identifying information, the service may return the hash value to the client.

Having received a mapping value, such as a hash value that may represent identifying information, the client may request affiliated data associated with the identifying information by providing the hash value as a substitute to the actual identifying information, as in block 920. In one example, the hash value may be sent to an information server that may store customer information that may be referenced by hash values representing identifying information. The rows within a customer information data store may contain hash sets representing a range of the identifying information. For example, a range of telephone numbers may be stored in a customer information data store as a set of hash values in multiple rows as opposed to storing the actual range of telephone numbers in a single row. As an illustration, to represent a range of telephone numbers 867-5309 to 867-5312 as a set of SHA-1 hash values, a customer data store may include the following rows:

Telephone Number
814FF90C56A74B5E2BB48CD240331867A95357E1 (867-5309)
1B27FCAF3CF45C4F6D3122E09627D5FF423AE 127 (867-5310)
B346DF325897607187CA412CA0ED208974752061 (867-5311)
BF512AB41F0B00D59AB2E9A7A63B644DDC2A4759 (867-5312)

Because storing a range of hash values involves using more rows compared to storing an actual range value, a tradeoff between storage space and hiding identifying information from unauthorized services may be made. The row that contains a hash value reference that matches the hash value provided by the client may be identified and the affiliated data contained in the row or associated with the set may be selected and sent to the client and, as in block 930, the client may receive the affiliated data associated with the identifying information.

Figure 10:
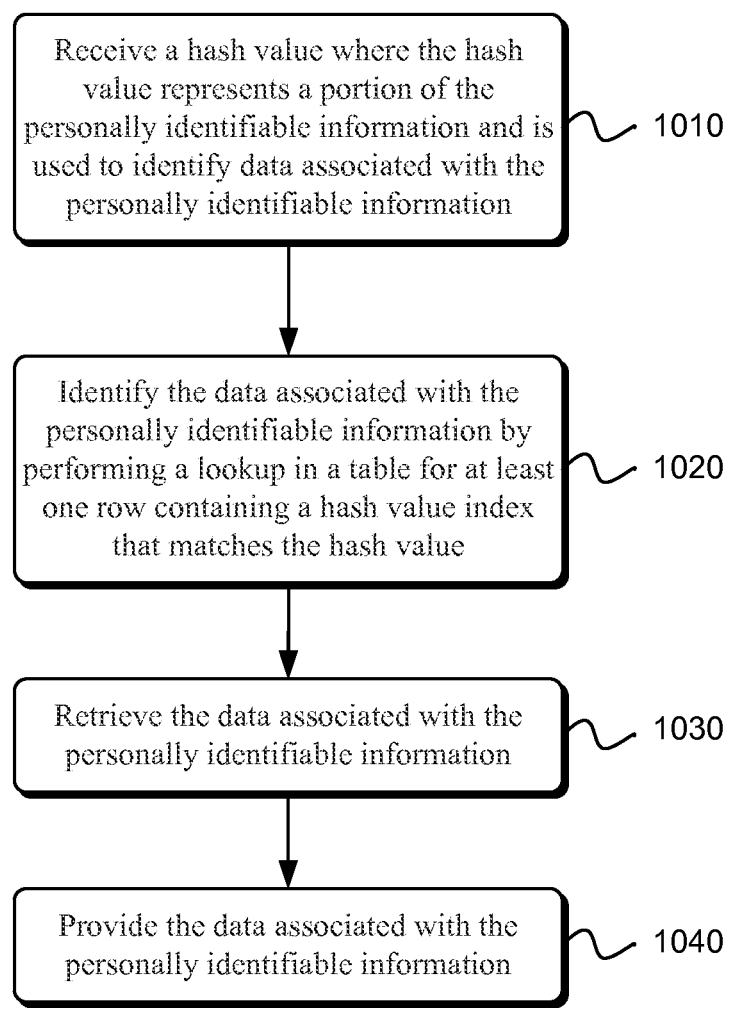
FIG. 10 is a flowchart illustrating an example of a method to provide data associated with personally identifiable information while protecting the personally identifiable data.

FIG. 10 is a flowchart illustrating an example method to provide data associated with personally identifiable information while protecting the personally identifiable data. As in block 1010, the method may receive a mapping value where the mapping value may represent personally identifiable information that may be used to identify data associated with the personally identifiable information. For example, a hash value may be used as a mapping value and may represent a customer's zip code, social security number, birth date or any other type of personally identifiable information. In one example, a hash value may represent a portion of the personally identifiable information. For instance, a number of characters may have been selected from the personally identifiable information and used to generate the hash value.

As in block 1020, the method may identify data associated with the hash value by performing a lookup in a table for at least one row containing a hash value lookup that matches the hash value. Examples of data associated with identifiable information may include shipping rates associated with a zip code, product order information that may be associated with a customer's email address, health statistics associated with a patients ID, and similar uses. In one example, the method may query a lookup table that may be referenced by hash values representing personally identifiable information and contain a reference to data associated with the personally identifiable information. In another example, the method may query a data store containing data associated with personally identifiable information that may be referenced by a hash value representing the personally identifiable information.

As in block 1030, the method may retrieve the data associated with the personally identifiable information from a data store by selecting the data from rows that may contain a hash value reference that matches the hash value representing the personally identifiable information, and then, as in block 1040, the method may provide the data to the service or module that may have requested the data.

Figure 11:
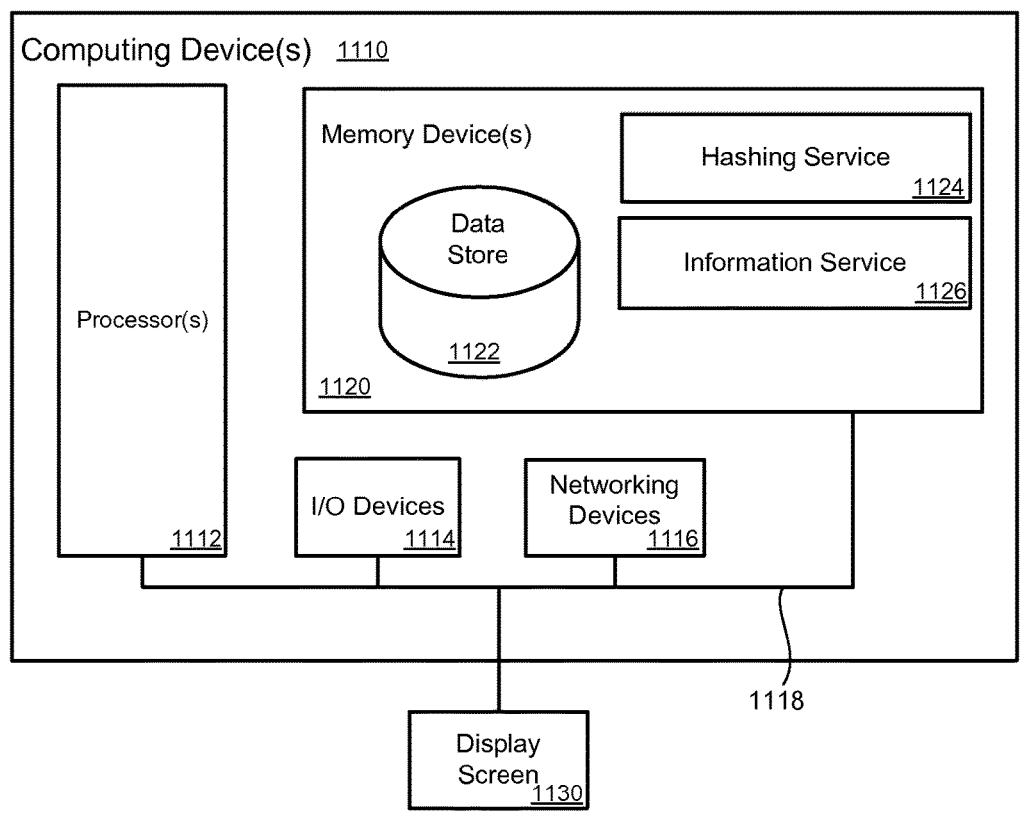
FIG. 11 is block diagram illustrating an example of a computing device that may be used to execute a method for obfuscating personally identifiable information.

FIG. 11 illustrates a computing device 1110 on which modules of this technology may execute. A computing device 1110 is illustrated on which a high level example of the technology may be executed. The computing device 1110 may include one or more processors 1112 that are in communication with memory devices 1120. The computing device 1110 may include a local communication interface 1118 for the components in the computing device. For example, the local communication interface may be a local data bus and/or any related address or control busses as may be desired.

The memory device 1120 may contain modules that are executable by the processor(s) 1112 and data for the modules. Located in the memory device 1120 are services and modules executable by the processor. For example, a hashing service 1124, an information service 1126 and other modules may be located in the memory device 1120. The modules may execute the functions described earlier. A data store 1122 may also be located in the memory device 1120 for storing data related to the modules and other applications along with an operating system that is executable by the processor(s) 1112.

Other applications may also be stored in the memory device 1120 and may be executable by the processor(s) 1112. Components or modules discussed in this description that may be implemented in the form of software using high programming level languages that are compiled, interpreted or executed using a hybrid of the methods.

The computing device may also have access to I/O (input/output) devices 1114 that are usable by the computing devices. An example of an I/O device is a display screen 1140 that is available to display output from the computing devices. Other known I/O device may be used with the computing device as desired. Networking devices 1116 and similar communication devices may be included in the computing device. The networking devices 1116 may be wired or wireless networking devices that connect to the internet, a LAN, WAN, or other computing network.

The components or modules that are shown as being stored in the memory device 1120 may be executed by the processor(s) 1112. The term "executable" may mean a program file that is in a form that may be executed by a processor 1112. For example, a program in a higher level language may be compiled into machine code in a format that may be loaded into a random access portion of the memory device 1120 and executed by the processor 1112, or source code may be loaded by another executable program and interpreted to generate instructions in a random access portion of the memory to be executed by a processor. The executable program may be stored in any portion or component of the memory device 1120. For example, the memory device 1120 may be random access memory (RAM), read only memory (ROM), flash memory, a solid state drive, memory card, a hard drive, optical disk, floppy disk, magnetic tape, or any other memory components.

The processor 1112 may represent multiple processors and the memory 1120 may represent multiple memory units that operate in parallel to the processing circuits. This may provide parallel processing channels for the processes and data in the system. The local interface 1118 may be used as a network to facilitate communication between any of the multiple processors and multiple memories. The local interface 1118 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computer implemented method, comprising:
   requesting a mapping value that represents identifying information from a first service, using a processor, wherein the request for the mapping value includes an identifier associated with the identifying information, and the first service uses the identifier to locate the identifying information and generate the mapping value from a specified portion of an item of the identifying information;
   receiving the mapping value representing the identifying information from the first service, using the processor;
   requesting affiliated data associated with the identifying information from a second service, using the processor, wherein the request for the affiliated data includes the mapping value representing the identifying information, and wherein the second service uses the mapping value to identify the affiliated data associated with the identifying information; and
   receiving the affiliated data associated with the identifying information from the second service, using the processor.

2. A method as in claim 1, wherein the first service uses a lookup table to generate the mapping value from the specified portion of the item of identifying information.

3. A method as in claim 1, wherein requesting the mapping value further comprises providing the first service with a parameter that specifies a number of characters of the identifying information to use to generate the mapping value.

4. A method as in claim 1, wherein the affiliated data associated with the identifying information is linked to the mapping value so that the mapping value references the affiliated data.

5. A method as in claim 1, wherein the affiliated data associated with the identifying information is stored within a hash set where the hash set is associated with a range of identifying information.

6. A method as in claim 1, wherein the affiliated data associated with the identifying information is stored in a table that is indexed by a set of mapping values that correspond to the mapping value.

7. A method as in claim 1, wherein the mapping value is a hash value generated from the specified portion of the item of identifying information.

8. A method as in claim 7, further comprising requesting the hash value via an Application Programming Interface (API) that includes parameters that identify the identifying information and specify a number of characters of the identifying information to use as the specified portion of the item of identifying information which is used to generate the hash value.

9. A method as in claim 1, further comprising providing to a hashing service an identifier that is associated with the identifying information and a parameter used to determine a subset of characters of the identifying information, which is used as the specified portion of the item of identifying information, to convert to a hash value.

10. A method as in claim 9, wherein the hashing service uses a Keyed-hash Message Authentication Code (HMAC) to convert the specified portion of the item of identifying information to the hash value based upon the parameter.

\* \* \* \* \*